United States Patent
Narayan et al.

(10) Patent No.: US 10,298,526 B2
(45) Date of Patent: May 21, 2019

(54) ANTI-SPAM TRANSIENT ENTITY CLASSIFICATION

(71) Applicant: OATH INC., New York, NY (US)

(72) Inventors: Sharat Narayan, Sunnyvale, CA (US); Vishwanath Tumkur Ramarao, Sunnyvale, CA (US); Belle Tseng, Cupertino, CA (US); Markus Weimer, Santa Clara, CA (US); Young Maeng, Sunnyvale, CA (US); Jyh-Shin Shue, Sunnyvale, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 15/263,238

(22) Filed: Sep. 12, 2016

(65) Prior Publication Data

US 2017/0012912 A1    Jan. 12, 2017

Related U.S. Application Data

(63) Continuation of application No. 13/222,720, filed on Aug. 31, 2011, now Pat. No. 9,442,881.

(51) Int. Cl.
| | |
|---|---|
| *G06F 15/16* | (2006.01) |
| *H04L 12/58* | (2006.01) |
| *G06Q 10/10* | (2012.01) |
| *H04L 29/12* | (2006.01) |
| *H04L 29/08* | (2006.01) |

(52) U.S. Cl.
CPC ............ *H04L 51/12* (2013.01); *G06F 15/16* (2013.01); *G06Q 10/107* (2013.01); *H04L 51/046* (2013.01); *H04L 61/2007* (2013.01); *H04L 67/2866* (2013.01)

(58) Field of Classification Search
CPC .............................. H04L 51/046; H04L 51/12
USPC ................................................. 709/231, 232
See application file for complete search history.

(56) References Cited

U.S. PATENT DOCUMENTS

| | | | |
|---|---|---|---|
| 6,226,680 B1 * | 5/2001 | Boucher ................... | G06F 5/10 709/230 |
| 8,200,761 B1 * | 6/2012 | Tevanian ................ | H04L 51/12 709/206 |
| 2004/0215977 A1 * | 10/2004 | Goodman ............ | G06Q 10/107 726/22 |

(Continued)

*Primary Examiner* — Karen C Tang
(74) *Attorney, Agent, or Firm* — James J. DeCarlo; Greenberg Traurig, LLP

(57) ABSTRACT

Embodiments are directed towards multi-level entity classification. An object associated with an entity is received. In one embodiment the object comprises and email and the entity comprises the IP address of a sending email server. If the entity has already been classified, as indicated by an entity classification cache, then a corresponding action is taken on the object. However, if the entity has not been classified, the entity is submitted to a fast classifier for classification. A feature collector concurrently fetches available features, including fast features and full features. The fast classifier classifies the entity based on the fast features, storing the result in the entity classification cache. Subsequent objects associated with the entity are processed based on the cached result of the fast classifier. Then, a full classifier classifies the entity based on at least the full features, storing the result in the entity classification cache.

19 Claims, 5 Drawing Sheets

(56) References Cited

U.S. PATENT DOCUMENTS

| | | | | |
|---|---|---|---|---|
| 2006/0277257 | A1* | 12/2006 | Kromann | H04L 47/36 709/206 |
| 2009/0300012 | A1* | 12/2009 | Levow | G06Q 10/107 |
| 2010/0306856 | A1* | 12/2010 | Suciu | G06Q 10/107 726/27 |
| 2012/0078845 | A1* | 3/2012 | Kasbekar | G06Q 10/107 707/640 |
| 2012/0079036 | A1* | 3/2012 | Andersen | H04L 51/12 709/206 |
| 2012/0131107 | A1* | 5/2012 | Yost | H04L 51/12 709/206 |

* cited by examiner

ANTI-SPAM TRANSIENT ENTITY CLASSIFICATION

CROSS REFERENCE TO RELATED APPLICATIONS

This application is a continuation of and claims the benefit of U.S. patent application Ser. No. 13/222,720, filed on Aug. 31, 2011, now U.S. Pat. No. 9,442,881, which is hereby incorporated by reference herein in its entirety.

TECHNICAL FIELD

The present invention relates generally to entity classification, and more specifically but not exclusively to identifying spammers by classifying a transient entity, such as an IP address, associated with a received message.

BACKGROUND

By some measures 80-90% of electronic messages are spam—an estimated 7,000,000,000 (7 trillion) in 2011. Spam annoys and offends recipients, drains tens of billions of dollars annually in lost productivity, and is a common vector for computer viruses and phishing scams. Spam also imposes costs on message service providers: operational costs such as hardware, bandwidth, and electricity are increased, while revenues decline as a degraded user experience drives away customers.

One method of reducing spam is IP blacklisting. Organizations such as SpamHaus classify IP addresses as belonging to spammers based on user feedback received from multiple message service providers. Then, every few hours, SpamHaus publishes an updated blacklist containing spammer IP addresses. Message service providers use this blacklist to automatically discard messages originating from a blacklisted IP. However, spammers circumvent these lists by acquiring new IP addresses and sending millions of spam messages before the next blacklist is published. Moreover, spammers circumvent blacklists by employing botnets—collections of hijacked computers used to perform malicious tasks—that enable spammers to send a large volume of spam in aggregate while only sending a small volume of spam from millions of fluctuating, or constantly changing IP addresses.

Thus, Message Service Providers (MSPs) additionally employ user-based feedback systems to identify spamming IP addresses. If enough users indicate that messages received from a particular IP address are spam, then subsequent messages from that IP address will be blocked. However, a user-based feedback system typically takes time during which spammers can send millions of spam messages. For example, many spammers register accounts with a target MSP and continuously probe spam defenses by attempting to spam their own accounts. Once a spam message gets through, the spammer floods the MSP with millions of spam messages before the user-based feedback system can react.

As such, an unacceptable amount of spam continues to evade these and other spam filtering techniques. Therefore, improved methods of classifying transient entities, such as IP addresses, are needed. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
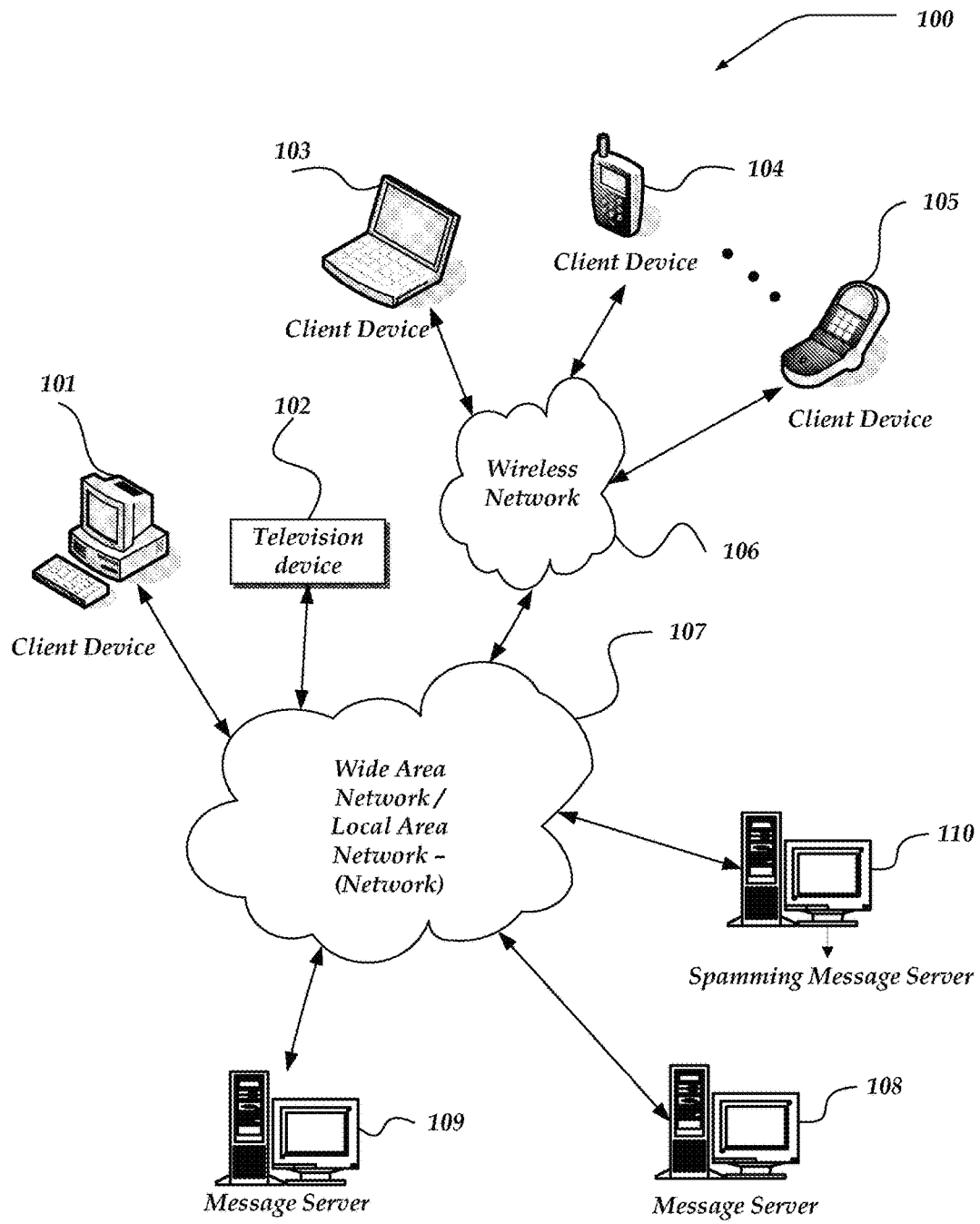
FIG. 1 is a system diagram that illustrates one embodiment of an environment in which the invention may be practiced.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "grid" or "grid computing system" refers to a combination of distributed computer resources acting together to perform computing tasks. In one embodiment, a grid computing system is employed to perform tasks that are not time sensitive. In one embodiment, a grid computing system may comprise hundreds, thousands, or more individual computing nodes and employ divide and conquer algorithms to process tasks in parallel across a plurality of nodes.

As used herein, the term "message" refers to an electronic object of communication distributed over any kind of system, including (but not limited to) a(n) email, Instant Message (IM), Short Message Service (SMS) text message, Multimedia Messaging Service (MMS) message, newsgroup post, online game in-game message, social networking post, blog comment, wiki article, and the like.

As used herein, the term "spam" refers to an unsolicited electronic message, typically containing advertising, a phishing scam, computer malware, or some other unwanted payload. Spam may be embedded in any of the types of messages defined above.

As used herein, the term "entity" refers to a property of an object to be classified—that is, a property of an object about which more information is desired. For example, one object is an email message, and one entity associated with the email message is the IP address of the sending email server. Thus, the IP address may be classified as a "spammer", "not a spammer", "indeterminate", etc., based on one or more features associated with the entity.

As used herein, the term "object" refers to any item that has entities which may be classified. For example, an object may be an email message, a request for a web page containing advertisements, or the like.

Objects may have more than one entity on which to be classified. For example, another entity of an email is the domain name of the sending user, e.g. "spammerdomain.com" in an email sent from "notaspammer@spammerdomain.com". Thus the domain "spammerdomain.com" may be classified as a "spammer", "indeterminate", "not a spammer", and the like, based on associated features.

However, entities are not limited to properties of electronic messages. In general, an entity may represent anything about which more information is desired. For example, providers of web-based advertisements may want to know whether a newly registered user will be more receptive to an advertisement for a Chrysler or a Toyota. In this case, the newly registered user is the entity, and a web page request is the object.

As used herein, the term "to classify" refers to categorizing an entity based on features associated with the entity. In one embodiment, a classifier comprises a Bayes classifier, however other types of classifiers including decision trees, a neural networks, and maximum entropy classifiers, or the like, are similarly contemplated. For example, an email server transmitting from a particular IP address may be classified as a spammer, or not, based on features associated with the IP address.

As used herein, the term "feature" refers to a piece of information used to classify an entity. For example, if the entity being classified is the IP address of a sending email server, then some non-limiting features include the geographic location of the sending email server, a time zone of the sending email server (and thus a time of day when the email was sent) a number and/or rate of emails sent by the sending email server, and the like.

Continuing the example in which an entity comprises a newly registered consumer of web-based advertisements, fast features may comprise information known about the user upon registration, such as the web browser used, geographic location, and a language. Full features in this scenario comprise information derived from user activity after registration. For example, if the user is located in Detroit, Mich., then the fast classifier may classify him as receptive to a Chrysler ad. However, if the a full feature later reveals that he frequently visits websites associated with Honda®, then the full classifier may classify him as receptive to a Toyota ad.

Another example of a feature is whether an IP address sending an email is simultaneously (or was recently) logged into a legitimate website, in which case the sending email server is likely part of a botnet transmitting spam.

As used herein, the term "fast feature" refers to a feature that is typically fetched in less than a predefined time period. In one embodiment, fast feature refers to a feature that can be fetched in less than about 1 minute. However, this threshold is but one example, and it is similarly contemplated that the fast feature threshold may be as little as 5 seconds or as large as 3 minutes.

In some embodiments, a fast feature refers to a feature that is typically fetched without disrupting how the corresponding object is processed. For example, when the object is an email message and the entity is an IP address associated with the sending email server, then a fast feature may refer to a feature that is typically fetched with sufficient time remaining to take action on the email without disrupting an email transmission process. For example, the email transmission process may include a number of steps, such as creating a network connection between the sending email server and the receiving email server, transmitting the email, submitting the email to non-IP based spam filters such as content-based filters, and the like. In this embodiment, a fast feature may refer to a feature that is expected to be fetched before completion of one or more of these steps, or that is expected to be fetched with sufficient time remaining to take action on the email without interrupting the email transmission process.

For example, if the sending email server initiates a TCP connection with a SYN message, and the sending email server will wait no more than 30 seconds without receiving an ACK before closing the connection, then a fast feature is typically fetched with sufficient time to respond to the sending email server in less than 30 seconds. Note that 30 seconds is but one example duration, and that any other value is equally possible. In this scenario, if the fast classifier classifies an IP address as a spammer, then the receiving email server need not reply to the SYN message, thereby saving network bandwidth and computing power.

Other steps that occur during the processing of an email include completing a download of an email message, initiating non-IP based classification, and the like. As such, a fast feature may refer to a feature that is typically fetched with sufficient time remaining to classify the IP address and/or act on the email before non-IP based classifiers are employed.

Features may also be considered fast based on the complexity of the algorithm used to compute them, or whether computing them requires user feedback. In one embodiment, fast features refer to features that do not require aggregation of data, either data aggregated over time or data aggregated from disparate geographic locations. In another embodiment, a fast feature refers to a feature that does not require user feedback.

In one embodiment, fast features include features obtained by a direct lookup in a database, such as a geographic location, a hostname of the sending mail server, which ISP the sending mail server uses, software the sending mail server is running, and the like.

As used herein, the term "full feature" refers to any feature that is not a fast feature. Typically, if a fast feature is expected to take less than 1 minute to fetch, then a full feature is expected to take longer than 1 minute to fetch. In general, the threshold that determines if a feature is a fast feature is the same threshold used to determine if a feature is a full feature—features are fast or full based on whether they take less time or more time, respectively, than the threshold. In one embodiment, a full feature refers to a feature that requires aggregating data, either across time or from disparate geographic locations. In one embodiment, a full feature refers to a feature that incorporates user feedback.

Another example of a full feature includes replying to the sending email server that "we are overwhelmed, come back in 5 minutes". If the sending email server re-transmits after 5 minutes, this is evidence that the sending email server is not a spammer.

Other examples of full features include: consulting with email servers around the world whether the sending email server has sent them spam messages, determining the sending rate of the sending email server, determining the network path taken by an email as it was transmitted from source email server to receiving email server, and the like.

As used herein, the term "transient entity" refers to an entity who's classification may change over time. For example, an IP address may be associated with a spammer today, but some time period later the same IP address is re-assigned to a legitimate email service provider. Another example is an sending IP address that is not a spammer today, but tomorrow is infected by a botnet and begins transmitting spam.

As used herein, the term "message service provider" refers to a provider of messaging services, including the receiving, storing, authoring, and/or transmitting of any of the types of messages defined above. Examples of message service providers include corporate instant messaging services, social network sites, web-based email services such as Yahoo!® Mail, and the like.

The following briefly describes the embodiments in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards methods and systems for multi-level entity classification. In one embodiment, an object associated with an entity is received. For example, an email message (object) associated with an IP address (entity) is received. If the entity has already been classified, as indicated by an entity classification cache, then a corresponding action is taken on the object. Continuing the email example, if the IP address has been classified as a spammer, then the email message (object) may be discarded, delivered to a spam box, or otherwise not delivered to the intended recipient(s).

However, if the entity has not been classified, the entity is submitted to a fast classifier for classification. In one embodiment, upon submission for classification, a feature collector concurrently initiates requests for features associated with the entity. In one embodiment, features are fetched in parallel by a plurality of agents. In one embodiment, both fast features and full features are fetched in parallel, such that initiating the fetching of one feature does not depend on completing the fetching of another feature. The fast classifier classifies the entity based on the fast features, storing the result in the entity classification cache. Subsequent requests to the entity classification cache will find the existing classification. In one embodiment, the result of the fast classifier may also cause an action to be taken on the object. Continuing the email example, if the fast classifier indicates that an IP address is associated with a spammer, then the email message (object) may be discarded or otherwise not delivered.

In one embodiment, the feature collector submits both fast and full features for processing by the full classifier. In one embodiment, the result of the full classifier is also stored in the same entity classification cache, typically replacing the result of the fast classifier.

One of ordinary skill in the art will appreciate that filtering messages based on the IP address of the sending email server has the potential to reduce the operational costs associated with spam filtering. For example, content based spam filtering is expensive, typically including parsing the message, finding the text, downloading attached images, detecting text on the attached images, etc. Enabling a decision based on IP address alone avoids these costs and increases overall system throughput.

Moreover, enabling multiple layers of classification, including a layer of classification based on fast features, mitigates situations where a spammer identifies a weakness in spam defenses and in a matter of minutes floods the message service with millions of spam messages. In this scenario, the fast classifier creates a first line of defense while the full classifier generates a more accurate classification.

Although the above description includes two levels of features and two levels of classifiers, additional levels of classifiers and corresponding levels of features are similarly contemplated. One beneficial result of multi-layered classification is the ability to classify an entity as fast features become available, thereby reducing amount of time until an entity is classified with some features, while at the same time incrementally increasing the accuracy of classification as additional features are available and processed.

Illustrative Operating Environment

FIG. 1 shows is a system diagram that illustrates one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 107, wireless network 106, client devices 101-105, message servers 108-109, and spamming message server 110.

One embodiment of client devices 101-105 is described in more detail below in conjunction with FIG. 2. Generally, however, client devices 103-105 may include virtually any portable computing device capable of receiving and sending a message over a network, such as network 107, wireless network 106, or the like. Client devices 103-105 may also be described generally as client devices that are configured to be portable. Thus, client devices 103-105 may include virtually any portable computing device capable of connecting to another computing device and receiving information. Such devices include portable devices, such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. As such, client devices 103-105 typically range widely in terms of capabilities and features. In one non-limiting example, a cell phone may have a numeric keypad and a few lines of monochrome Liquid Crystal Display (LCD) display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including a spam email if the client device has been infected by a botnet, or user-based feedback when a user identifies a message as spam, performing various online activities such as browsing a website, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 101-105 may operate over wired and/or wireless network. Client device 102 may include virtually any device useable as a television device. Today, many of these devices include a capability to access and/or otherwise communicate over a network such as network 107 and/or even wireless network 106. Moreover, client device 102 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform various actions and/or activities over a network (online), such as checking an email account, marking an email as spam, and the like. However, another application may also be used to perform various online actions and/or activities.

Client devices 101-105 may further be configured to include a client application that enables an end-user to log into an electronic message account that may be managed by another computing device, such as message servers 108-109, or the like. Such end-user accounts, in one non-limiting example, may be configured to enable the end-user to send, receive, compose, forward, identify spam, or otherwise manage electronic messages. Client devices 101-105 may further be configured to register for an account on an online service provider that displays advertisements.

Wireless network 106 is configured to couple client devices 103-105 and its components with network 107. Wireless network 106 may include any of a variety of wireless sub-networks that may further overlay stand-alone ad-hoc networks, and the like, to provide an infrastructure-oriented connection for client devices 103-105. Such sub-networks may include mesh networks, Wireless LAN (WLAN) networks, cellular networks, or the like. In one embodiment, the system may include more than one wireless network.

Wireless network 106 may further include an autonomous system of terminals, gateways, routers, and the like connected by wireless radio links, and the like. These connectors may be configured to move freely and randomly and organize themselves arbitrarily, such that the topology of wireless network 106 may change rapidly.

Wireless network 106 may further employ a plurality of access technologies including 2nd (2G), 3rd (3G), 4th (4G) generation radio access for cellular systems, WLAN, Wireless Router (WR) mesh, and the like. Access technologies such as 2G, 3G, 4G and future access networks may enable wide area coverage for mobile devices, such as client devices 103-105 with various degrees of mobility. In one non-limiting example, wireless network 106 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 106 may include virtually any wireless communication mechanism by which information may travel between client devices 103-105 and another computing device, network, and the like.

Network 107 is configured to couple network devices with other computing devices, including, message servers 108-109, spamming message server 110, client devices 101 and 102, and through wireless network 106 to client devices 103-105. Network 107 is enabled to employ any form of computer readable media for communicating information from one electronic device to another. Also, network 107 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In one embodiment, network 107 may be configured to transport information of an Internet Protocol (IP). In essence, network 107 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of Messenger servers 108-109 and spamming messenger server 110 (servers 108-110) is described in more detail below in conjunction with FIG. 3. Briefly, however, servers 108-110 include virtually any network device usable to operate as messenger servers. Servers 108-110 may include an email server, an instant messaging server, an SMS/MMS text server, a social networking server, a blog server, a newsgroup server, or the like, or any combination thereof. Moreover, Servers 108-110 may also operate as a File Transfer Protocol (FTP) server, a database server, activity download server, or the like.

Although FIG. 1 illustrates each of servers 108-110 as a single computing device, the invention is not so limited. For example, one or more functions of the servers 108-110 may be distributed across one or more distinct network devices.

Devices that may operate as servers 108-110 include various network devices, including, but not limited to personal computers, desktop computers, multiprocessor systems, microprocessor-based or programmable consumer electronics, network PCs, server devices, network appliances, and the like. It should be noted that while servers 108-110 are each illustrated as a single network device, embodiments are not so limited. Thus, in another embodiment, each of servers 108-110 may be distributed across one or more distinct network devices. For example, in one embodiment, each of servers 108-110 may be implemented using a cloud architecture, being distributed over a plurality of network devices, or any of a variety of configurations. These embodiments are not meant to be construed as being limited to any one particular configuration.

Illustrative Client Device

Figure 2:
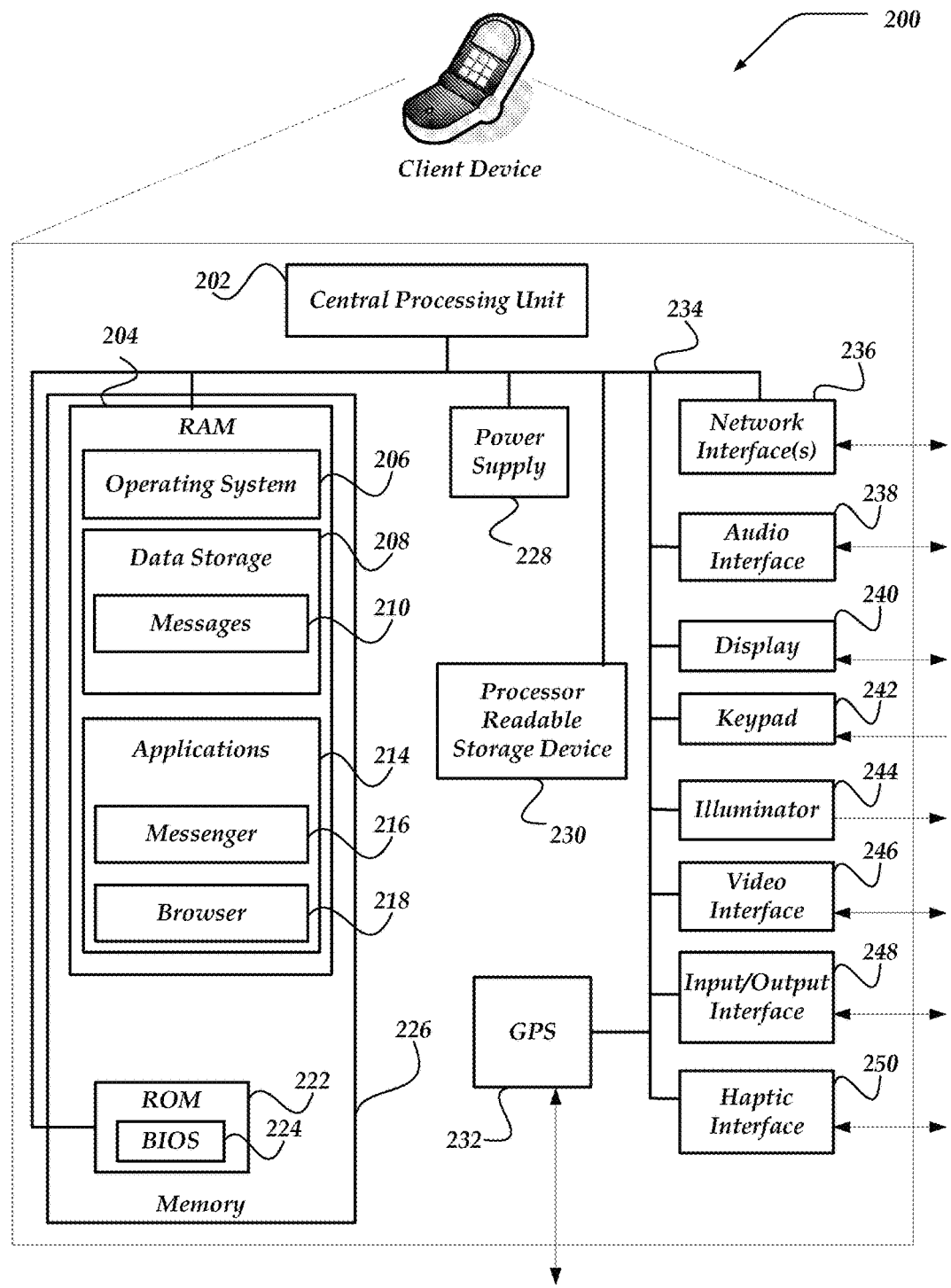
FIG. 2 illustrates one embodiment of a client device that may be included in a system implementing the invention.

FIG. 2 illustrates one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-105 of FIG. 1.

As shown in the figure, client device 200 includes a central processing unit (CPU) 202 in communication with a mass memory 226 via a bus 234. Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), Session Initiation Rrotocol (SIP)/Realtime Transport Protocol (RTP), or any of a variety of other wireless communication protocols. Network interface 236 is sometimes known as a transceiver, transceiving device, or network interface card (NIC).

Audio interface 238 is arranged to produce and receive audio signal s such as the sound of a human voice. For example, audio interface 238 may be coupled to a speaker and microphone (not shown) to enable telecommunication with others and/or generate an audio acknowledgement for some action. Display 240 may be a liquid crystal display (LCD), gas plasma, light emitting diode (LED), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images. Illuminator 244 may provide a status indication and/or provide light. Illuminator 244 may remain active for specific periods of time or in response to actions. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

Optional GPS transceiver 232 can determine the physical coordinates of client device 200 on the surface of the Earth, which typically outputs a location as latitude and longitude values. GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control (MAC) address, IP address, or the like.

Mass memory 226 includes a RAM 204, a ROM 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store messages 210, including spam messages, that have been downloaded from a message service provider. Messages 210 may include any type of electronic message, as described herein.

Applications 214 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, IM applications, SMS applications, VOIP applications, contact managers, task managers, transcoders, database programs, word processing programs, security applications, spreadsheet programs, games, search programs, and so forth. Applications 214 may include, for example, messenger 216 and browser 218.

Browser 218 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. However, any of a variety of other web-based languages may be employed. In one embodiment, browser 218 may enable a user of client device 200 to view electronic messages, and to provide user feedback to one of messaging servers 108-109 identifying spam messages.

Messenger 216 may be configured to manage a messaging session using any of a variety of messaging communications including, but not limited to email, Short Message Service (SMS), Instant Message (IM), Multimedia Message Service (MMS), internet relay chat (IRC), mIRC, RSS feeds, and/or the like. For example, in one embodiment, messenger 216 may be configured as an IM application, such as AOL Instant Messenger, Yahoo! Messenger, .NET Messenger Server, ICQ, or the like. In one embodiment, messenger 216 may be configured to include a mail user agent (MUA) such as Elm, Pine, MH, Outlook, Eudora, Mac Mail, Mozilla Thunderbird, or the like. In another embodiment, messenger 216 may be a client application that is configured to integrate and employ a variety of messaging protocols, including, but not limited to various push and/or pull mechanisms for client device 200. In one embodiment, messenger 216 may interact with browser 218 for managing messages. As used herein, the term "message" refers to any of a variety of messaging formats, or communications forms, including but not limited to email, SMS, IM, MMS, IRC, or the like.

In one embodiment, messenger 216 may be configured to receive messages sent from network devices, such as message servers 108-109 of FIG. 1.

Illustrative Network Device

Figure 3:
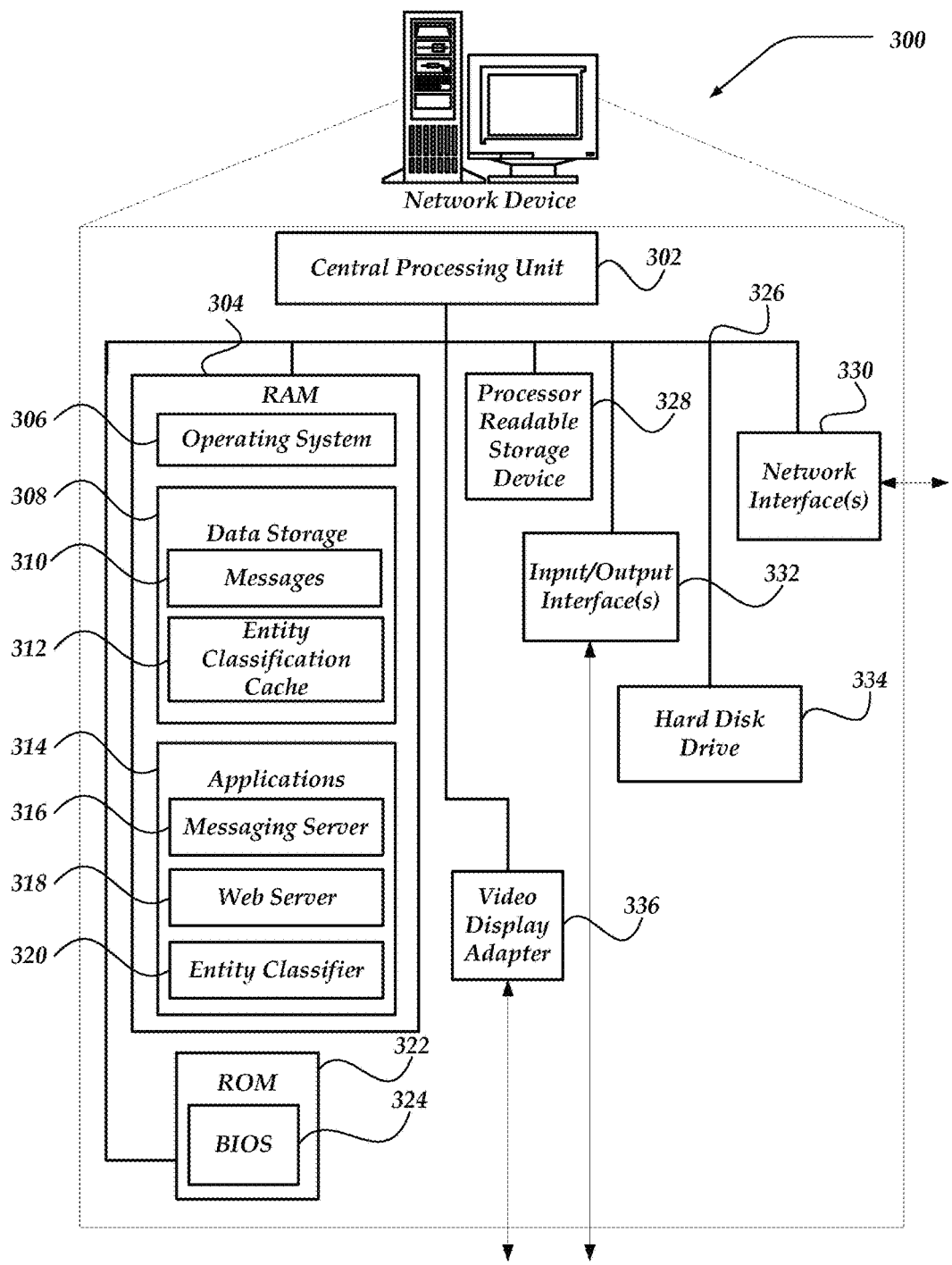
FIG. 3 illustrates one embodiment of a network device that may be included in a system implementing the invention.

FIG. 3 illustrates one embodiment of network device 300 that may be included in a system implementing the invention. Network device 300 may include many more or less components than those shown. The components shown, however, are sufficient to disclose an illustrative embodiment. Network device 300 may be configured to operate as a server, client, peer, or any other device. Network device 300 may represent, for example servers 108-110 of FIG. 1.

Network device 300 includes processing unit 302, video display adapter 336, input/output interface 332, and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. Basic input/output system ("BIOS") 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a headset, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage device. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical device which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit (CPU) 302 to execute and perform actions. In one embodiment, at least some of data store 308 might also be stored on another component of network device 300, including, but not limited to processor-readable storage device 328, hard disk drive 334, or the like. Data storage 308 may further store messages 310 and/or entity classification cache 312, as well as received objects, entities, and associated features. Messages 310 may include a received message that may or may not be classified as spam. Entity classification cache 312 may include list of entities and their associated classification. In one embodiment, each entry in the entity classification cache also indicates which classifier created the entry.

The mass memory also stores program code and data. One or more applications 314 are loaded into mass memory and run on operating system 306. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Messaging server 316, web server 318, and entity classifier 320 may also be included as application programs within applications 314.

Messaging server 316 may include virtually any computing component or components configured and arranged to forward messages from message user agents, and/or other message servers, or to deliver messages to a local message store, such as messages 310, or the like. Thus, messaging server 316 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. Messaging server 316 may also be managed by one or more components of messaging server 316. Thus, messaging server 316 may also be configured to manage SMS messages, IM, MMS, IRC, RSS feeds, mIRC, or any of a variety of other message types. In one embodiment, messaging server 316 may enable users to initiate and/or otherwise conduct chat sessions, VOIP sessions, or the like.

Web server 318 represents any of a variety of services that are configured to provide content, including messages, over a network to another computing device. Thus, web server 318 includes, for example, a web server, a File Transfer Protocol (FTP) server, a database server, a content server, or the like. Web server 318 may provide the content including messages over the network using any of a variety of formats including, but not limited to WAP, HDML, WML, SMGL, HTML, XML, cHTML, xHTML, or the like.

Figure 4:
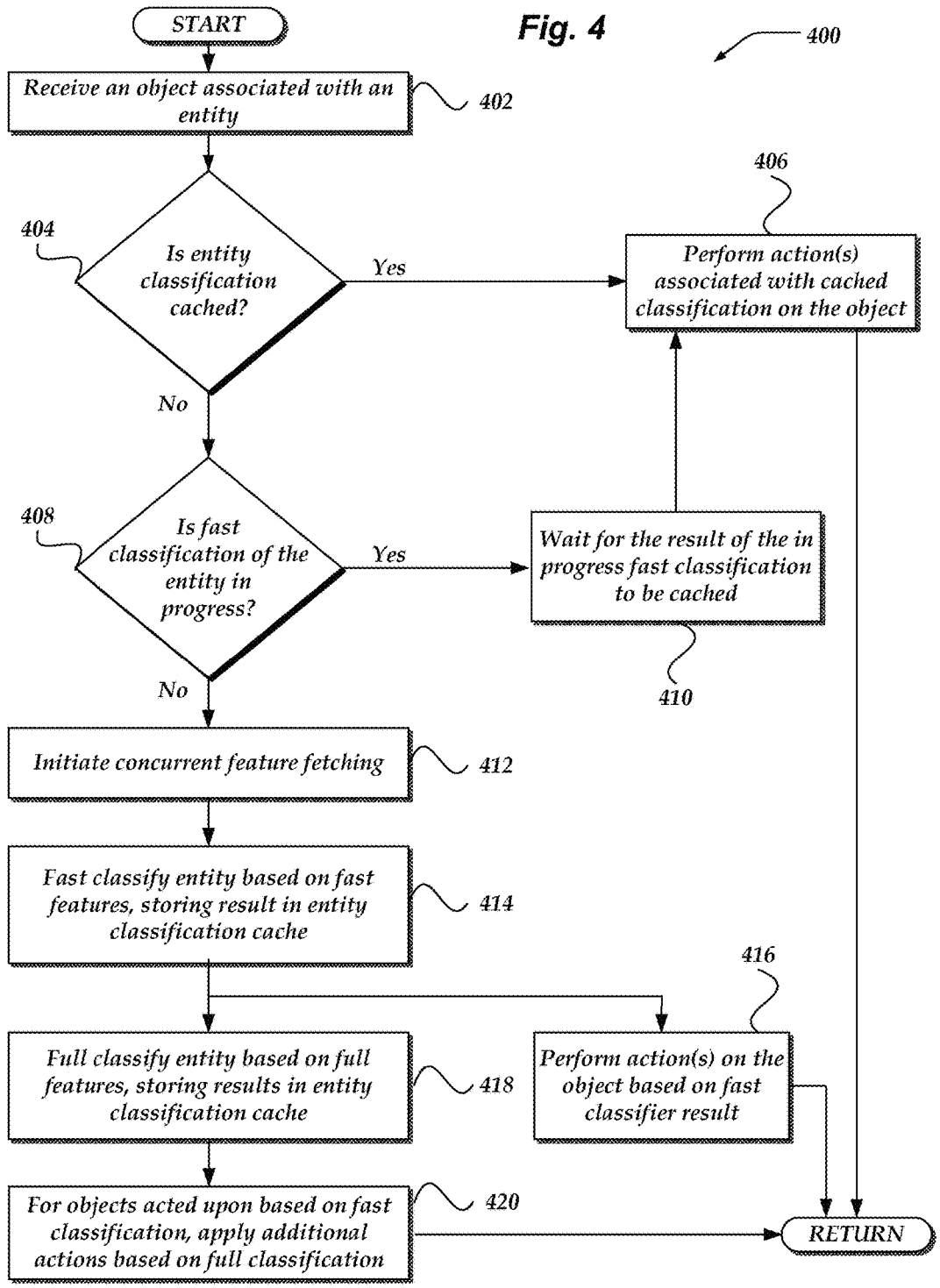
FIG. 4 is a logical flow diagram that illustrates one embodiment of an process for multi-level classification of an entity.

Entity classifier 320 includes a multi-layer entity classification system, as described in more detail below in conjunction with FIGS. 4 and 5. Briefly, Entity classifier 320 performs a fast classification on an entity based on fast features retrieved from a feature collector. In one embodiment, the result of the classification is stored in entity classification cache 312. If the result of the fast classification is definitive, then an action may be performed accordingly. In one embodiment, if the entity is an IP address associated with a sending email server, and the classification of the IP address is that of a spammer, then the action may be to discard the associated email message before delivering it to a user's inbox. Entity classifier 320 may perform actions such as those described below in conjunction with FIG. 4.

General Operation

The operation of certain aspects of the invention will now be described with respect to FIGS. 4 and 5. FIG. 4 is a logical flow diagram that illustrates one embodiment of a process for multi-level classification of an entity. FIG. 4 is described with reference to FIG. 5, which illustrates a non-limiting and non-exhaustive example architecture employed by entity classifier 320 of FIG. 3.

Process 400 begins, after a start block, at block 402, where an object associated with an entity is received. In one embodiment the object is an electronic message and the entity is an IP address of the mail server that sent the electronic message. In this embodiment, classifying an entity quickly, and thereby enabling an email to be processed quickly, is beneficial for a number of reasons. For example, message recipients typically expect emails to be delivered quickly. Moreover, the sending email server also expects emails to be delivered quickly, so that it's connection to the receiving email server can be closed as soon as possible. If the receiving email server takes too long, the sending email server may close the connection without delivering the email. However, the goal of quick email delivery conflicts with another goal—optimized classification based on comprehensive feature extraction. Thus it is with consideration to these competing concerns that aspects are directed.

Figure 5:
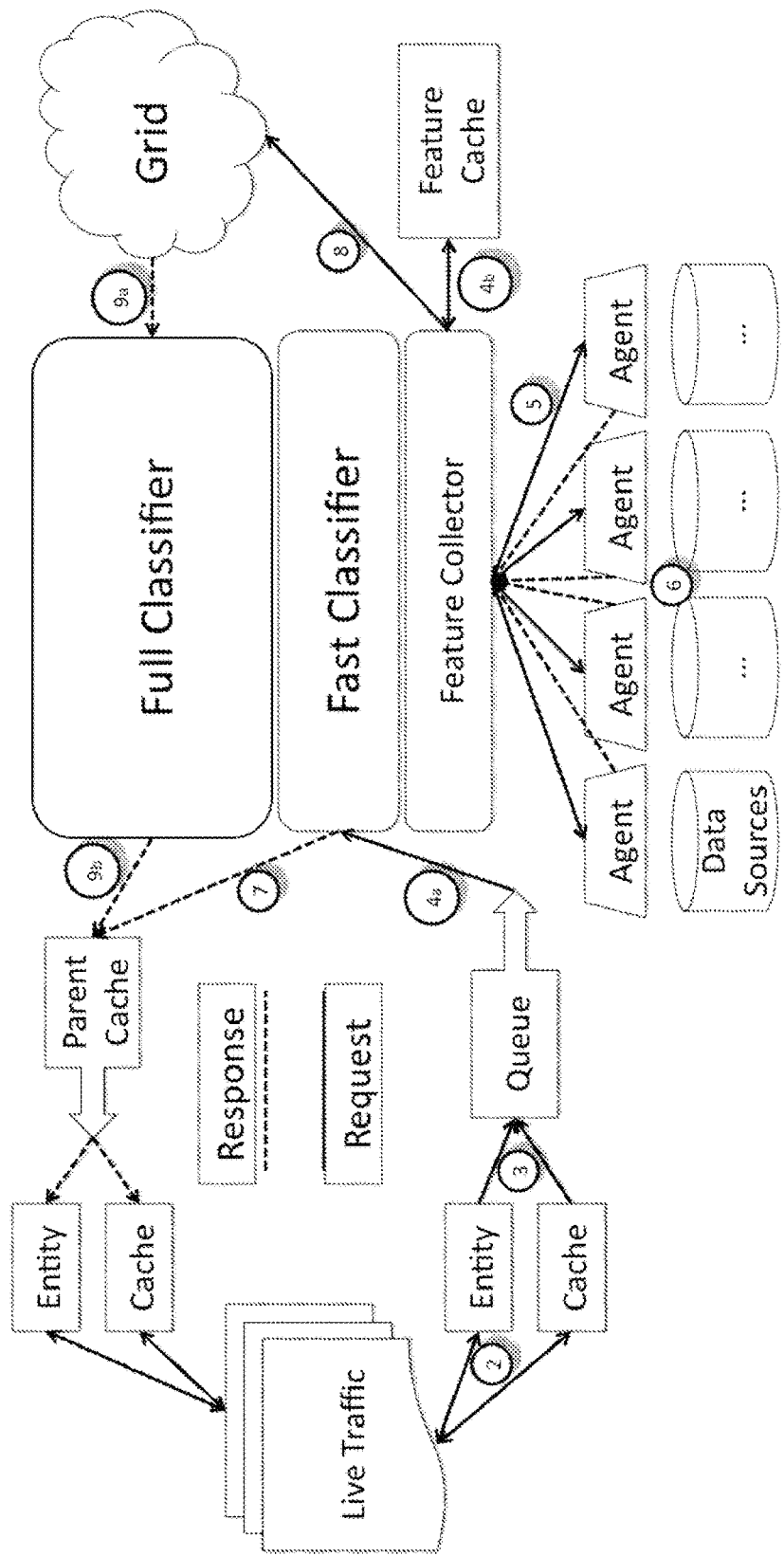
FIG. 5 illustrates a non-limiting and non-exhaustive example architecture used for multi-level classification of an entity.

Process 400 proceeds to decision block 404, where the entity classification cache is consulted to determine if the entity has already been classified and cached (step 2 of FIG. 5). If the entity has already been classified and cached, then the process proceeds to block 406 where an associated action may be performed on the received object. Continuing the email example, if the entity comprises an IP address of a sending mail server, and the IP address has been classified as belonging to a spammer, then email messages may not be accepted from the sending mail server. Additionally or alternatively, if an email message has already been received from the sending mail server, it may not be delivered, or it may be delivered to the recipient's spam folder. However, if the IP address has been classified as not belonging to a spammer, or if the classification is indeterminate, then the email may be delivered to the recipient's inbox. Regardless of the action taken, the process 400 then returns to a calling process to perform other actions.

Otherwise, if the entity has not been classified or cached at decision block 404, the process proceeds to decision block 408, where in one embodiment a determination is made whether a fast classification of the entity is already in progress. In one embodiment, a fast classification may already be in progress because a previously received object triggered a fast classification of the same entity. Continuing the email example, a fast classification may be in progress if a first email received from an IP address initiates a fast classification, but the fast classification has not completed (or the result of the fast classification has not been cached) when a subsequent email from the same IP address is received. In one embodiment, waiting for the result of the classification of the first email's IP address is faster and consumes fewer system resources than duplicating the fast classification.

If it is determined that a fast classification of the entity is already in progress, then the process proceeds to block 410 to wait for the result of the in progress fast classification to be cached. Once the in progress fast classification has been cached, the process proceeds to block 406 where an action is taken on the object, as described above.

However, if at decision block 408 it is determined that a fast classification of the entity is not in progress, then the entity is submitted to a queue (step 3 of FIG. 5) for classification (step 4a of FIG. 5), and the process proceeds to block 412.

At block 412, process 400 fetches features associated with the entity. In one embodiment, features associated with the entity may have been fetched previously and cached in a feature cache. If features associated with the entity are located in the feature cache, then these cached features are retrieved (step 4b of FIG. 5). However, any features that are not cached may be concurrently fetched by a feature collector (step 5 of FIG. 5). In one embodiment, each feature is fetched by an agent and a one or more data sources associated with the agent (step 6 of FIG. 5). In one embodiment, features are stored as they are retrieved, for example on a grid or other form of elastic storage, for processing by the full classifier (step 8 of FIG. 5).

In one embodiment, the feature collector may also collect features about a feature—known as secondary features. For example, if one feature of an IP address is an ISP, then a secondary feature is a feature of the ISP, such as which outgoing ports the ISP blocks. In one embodiment, these secondary features are also cached so that subsequent requests to determine a secondary feature can be fulfilled quickly.

In one embodiment features are grouped into two or more groups, where each group is associated with a layer of classifier. For example, features may be grouped into fast features, associated with a fast classifier, and full features, associated with a full classifier. However, features may be grouped in any number of ways and associated with any number of classifiers.

Process 400 then proceeds to block 414, where a fast classifier classifies the entity based on fast features associated with the entity. In one embodiment the resulting classification is stored in the entity classification cache (step 7 of FIG. 5).

Continuing the email example, the fast classifier may determine if the sending email server is a spammer based on the fast features associated with the IP address. For example, if one feature of the IP address indicates that it is located in a region known to send spam, such as Nigeria, and another feature of the IP address indicates that the ISP of the IP address is commonly used by spammers, then the fast classifier may classify the IP address as a spammer. In another embodiment the fast classifier may classify the IP address as "not a spammer" or "safe". For example, if one feature of the IP address indicates that the IP address is assigned to a local government, then the IP address may be classified as "not a spammer". In another embodiment, the fast classifier may fail to reach a confidence threshold that is statistically significant enough to classify an IP address as a spammer or not, resulting in an "indeterminate" classification.

The fast classifier may then store the classification result in the entity classification cache. For example, if an IP address is classified as a spammer and an indication of this is stored in the entity classification cache, subsequent emails received from the same IP address may be discarded efficiently.

Process 400 then proceeds concurrently to blocks 416 and 418, splitting process 400 into a first branch and a second branch, respectively. In one embodiment, at block 416, the results of the fast classifier are used to perform an action on the received object, as described in block 406. The first branch of the process 400 then returns to a calling process to perform other actions.

In one embodiment, at block 418, the second branch of process 400 employs a full classifier to classify the entity based on all available associated features (step 9a of FIG. 5). In one embodiment, the full classifier utilizes fast features as well as "full features" that were not available to the fast classifier. In one embodiment the full classifier may utilize features comprising aggregations of data, such as a feature indicating how frequently an IP address is the source of an email, although any type of full feature as defined herein is similarly contemplated. In this way, the results of the full classifier tend to be more accurate than the results of the fast classifier.

In one embodiment the results of the full classifier are stored in the entity classification cache (step 9b of FIG. 5). In one embodiment the result of the full classifier replaces the result of the fast classifier in the entity classification cache. In one embodiment the result of the full classifier is marked as the result of a full classifier.

Process 400 then proceeds to block 420, where objects that had been acted upon based on the result of the fast classifier are acted on again based on the result of the full classifier. In one embodiment, an additional action is performed on these objects if the result of the full classifier is different than the result of the fast classifier. Continuing the email example, if the fast classifier indicated that an IP address was a spammer, then thousands or millions of subsequent emails from the same IP address may have been delivered to users' spam folders. However, if the full classifier indicates that the IP address is "not a spammer", then these thousands or millions of email messages may be automatically moved from users' spam folders to their inboxes without additional user intervention. Similarly, if an initial fast classification of "not a spammer" is superseded by a full classification of "spammer", some or all corresponding emails may be automatically moved from recipients' inboxes to their spam folders, again without user interaction.

After block 420, the second branch of process 400 returns to a calling process to perform other actions.

One of ordinary skill in the art will appreciate that process 400 classifies entities, not objects, and that entities are classified based on features associated with that entity. As such, multiple objects may be associated with the same entity. For example, multiple emails (objects) may share the same entity (IP address), thereby enabling cached entity classifications to be used to filter emails regardless of content, sending user, recipient, or the like.

One of ordinary skill in the art will also appreciate that classification takes time. For instance, even fast classification of an entity may not complete before subsequent objects associated with the same entity are received. Thus, any object received after the first object but before fast classification completes may wait for the fast classification before determining what action to perform on it. Similarly, any object received after the fast classification result has been cached will be acted upon based on the cached classification. Finally, once the full classification completes and caches its result, objects received subsequently will be acted upon based on the result of the full classifier.

In this way, an entity of the first received object is fast classified and then fully classified, such that subsequent objects are acted upon based on the classification of this single first object. This method of classification differs from voting based classification schemes which typically require multiple objects as input before classifying.

In one embodiment, an object may be acted upon based on the classification of multiple entities associated with the object. For example, an email may be associated with an IP address of the sending email server and with a domain name of email address in the "From:" line. If, for example, the IP address is classified as a spammer, but a domain name associated with the sender of the email message is classified as "not a spammer", then the email may be treated as "not a spammer", to avoid mis-handling legitimate emails. Other methods of combining multiple entity classifications are similarly considered, including requiring all entity classifications to agree before acting on an object, using a weighted average of classification results, a simple majority of classification results, or the like.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
receiving, by a computing device, a first message associated with an Internet Protocol (IP) address of a first mail server that sent the first message;
fetching, by the computing device, a plurality of features associated with the IP address, the plurality of features including one or more fast features and one or more full features, said fast features comprising features that do not require user feedback, said full features incorporating user feedback indicating how frequently the IP address is a source of a message;
classifying, by the computing device, the IP address with a fast classifier based on the one or more fast features;
determining, via the computing device, based on said classification, that the first mail server is a spammer;
caching, by the computing device, a result of said determination in an entity classification cache associated with said computing device;
receiving, by the computing device, a second message associated with the IP address;
performing, by the computing device, an action on the second message based on the cached result of the fast classifier;
classifying, by the computing device, the IP address with a full classifier based on the one or more full features and the one or more fast features;
caching, by the computing device, a result of the classification by the full classifier in the entity classification cache; and
moving, by the computing device, a plurality of received messages into a different folder based on the cached result of the full classifier.

2. The method of claim 1, wherein the fast feature further comprises a feature not requiring aggregation of data.

3. The method of claim 2, wherein the feature not requiring aggregation of data further comprises the feature not requiring aggregation of data over time.

4. The method of claim 2, wherein the feature not requiring aggregation of data further comprises the feature not requiring aggregation of data from disparate geographic locations.

5. The method of claim 1, wherein the full feature further comprises a feature requiring aggregation of data.

6. The method of claim 5, wherein the full feature requiring aggregation of data further comprises the full feature requiring aggregation of data over time.

7. The method of claim 5, wherein the full feature requiring aggregation of data further comprises the full feature requiring aggregation of data from disparate geographic locations.

8. The method of claim 1, wherein the moving of the plurality of received messages into the different folder further comprises moving the plurality of received messages into a spam folder.

9. The method of claim 1, wherein the moving of the plurality of received messages into the different folder further comprises moving the plurality of received messages into an inbox.

10. A non-transitory computer-readable storage medium tangibly encoded with computer-executable instructions, that when executed by a computing device, cause a computing device to perform a method comprising:
receiving, by a computing device, a first message associated with an Internet Protocol (IP) address of a first mail server that sent the first message;
fetching, by the computing device, a plurality of features associated with the IP address, the plurality of features including one or more fast features and one or more full features, said fast features comprising features that do not require user feedback, said full features incorporating user feedback indicating how frequently the IP address is a source of a message;
classifying, by the computing device, the IP address with a fast classifier based on the one or more fast features;
determining, via the computing device, based on said classification, that the first mail server is a spammer;
caching, by the computing device, a result of said determination in an entity classification cache associated with said computing device;
receiving, by the computing device, a second message associated with the IP address;
performing, by the computing device, an action on the second message based on the cached result of the fast classifier;
classifying, by the computing device, the IP address with a full classifier based on the one or more full features and the one or more fast features;
caching, by the computing device, a result of the classification by the full classifier in the entity classification cache; and
moving, by the computing device, a plurality of received messages into a different folder based on the cached result of the full classifier.

11. The non-transitory computer-readable storage medium of claim 10, wherein the fast feature further comprises a feature not requiring aggregation of data.

12. The non-transitory computer-readable storage medium of claim 11, wherein the feature not requiring aggregation of data further comprises the feature not requiring aggregation of data over time.

13. The non-transitory computer-readable storage medium of claim 11, wherein the feature not requiring aggregation of data further comprises the feature not requiring aggregation of data from disparate geographic locations.

14. The non-transitory computer-readable storage medium of claim 10, wherein the full feature further comprises a feature requiring aggregation of data.

15. The non-transitory computer-readable storage medium of claim 14, wherein the full feature requiring aggregation of data further comprises the full feature requiring aggregation of data over time.

16. The non-transitory computer-readable storage medium of claim 14, wherein the full feature requiring aggregation of data further comprises the full feature requiring aggregation of data from disparate geographic locations.

17. The non-transitory computer-readable storage medium of claim 10, wherein the moving of the plurality of received messages into the different folder further comprises moving the plurality of received messages into a spam folder.

18. The non-transitory computer-readable storage medium of claim 10, wherein the moving of the plurality of received messages into the different folder further comprises moving the plurality of received messages into an inbox.

19. A computing device, comprising:
a processor;
a non-transitory computer-readable storage medium for tangibly storing thereon program logic for execution by the processor, the stored program logic comprising:
  logic executed by the processor for receiving, by the computing device, a first message associated with an Internet Protocol (IP) address of a first mail server that sent the first message;
  logic executed by the processor for fetching, by the computing device, a plurality of features associated with the IP address, the plurality of features including one or more fast features and one or more full features, said fast features comprising features that do not require user feedback, said full features incorporating user feedback indicating how frequently the IP address is a source of a message;
  logic executed by the processor for classifying, by the computing device, the IP address with a fast classifier based on the one or more fast features;
  logic executed by the processor for determining, via the computing device, based on said classification, that the first mail server is a spammer;
  logic executed by the processor for caching, by the computing device, a result of said determination in an entity classification cache associated with said computing device;
  logic executed by the processor for receiving, by the computing device, a second message associated with the IP address;
  logic executed by the processor for performing, by the computing device, an action on the second message based on the cached result of the fast classifier;
  logic executed by the processor for classifying, by the computing device, the IP address with a full classifier based on the one or more full features and the one or more fast features;
  logic executed by the processor for caching, by the computing device, a result of the classification by the full classifier in the entity classification cache; and
  logic executed by the processor for moving, by the computing device, a plurality of received messages into a different folder based on the cached result of the full classifier.

* * * * *